(12) United States Patent
Dionne et al.

(10) Patent No.: US 7,927,518 B2
(45) Date of Patent: Apr. 19, 2011

(54) SEMI SOLID TIB$_2$ PRECURSOR MIXTURE

(75) Inventors: Martin Dionne, Jonquiere (CA);
Jean-Paul Robert Huni, Quebec (CA)

(73) Assignee: Alcan International Limited (CA)

( * ) Notice: Subject to any disclaimer, the term of this patent is extended or adjusted under 35 U.S.C. 154(b) by 668 days.

(21) Appl. No.: 11/933,526

(22) Filed: Nov. 1, 2007

(65) Prior Publication Data

US 2008/0156643 A1     Jul. 3, 2008

Related U.S. Application Data

(60) Provisional application No. 60/863,879, filed on Nov. 1, 2006.

(51) Int. Cl.
*H01B 1/08*     (2006.01)
*C01B 35/02*    (2006.01)
*C01B 35/10*    (2006.01)
*C01B 35/12*    (2006.01)

(52) U.S. Cl. ............. 252/521.4; 252/519.5; 252/519.52; 252/520.2; 252/520.22; 252/506; 252/507; 423/277; 423/278; 423/289; 423/291; 423/297

(58) Field of Classification Search .............. 423/297, 423/291, 111, 277, 278, 289; 501/96, 92; 419/12; 252/506, 507, 519.5, 519.52, 520.2, 252/520.22, 521.4; 264/29.1, 105; 205/372, 205/386, 387; 204/294
See application file for complete search history.

(56) References Cited

U.S. PATENT DOCUMENTS

| | | | | |
|---|---|---|---|---|
| 5,160,698 | A | * | 11/1992 | Khazai et al. ................... 419/12 |
| 5,194,234 | A | * | 3/1993 | Weimer et al. ................. 423/297 |
| 6,001,236 | A | | 12/1999 | de Nora et al. |
| 6,616,829 | B2 | * | 9/2003 | Keller et al. ................... 205/386 |
| 7,462,271 | B2 | * | 12/2008 | Dionne et al. ................. 205/386 |

FOREIGN PATENT DOCUMENTS

| | | | |
|---|---|---|---|
| EP | 0115745 | | 8/1984 |
| EP | 1141446 | | 10/2001 |
| EP | 0115702 | | 5/2008 |
| GB | 1004585 | * | 9/1965 |

OTHER PUBLICATIONS

International Search Report, PCT/CA2007/001951, dated Jan. 21, 2008.

* cited by examiner

*Primary Examiner* — Bruce F Bell
(74) *Attorney, Agent, or Firm* — Banner & Witcoff, Ltd.

(57) ABSTRACT

The invention relates to a metal boride precursor mixture comprising a metal oxide and a boric oxide combined in such a manner so as to produce intimately linked clusters wherein the boric oxide is found within the metal oxide. Furthermore, the invention discloses a carbon composite material made with the metal boride precursor mixture and a carbonaceous component. Finally, the invention also teaches the process for preparing the metal boride precursor mixture comprising steps of providing a metal oxide and a boron oxide, mechanically mixing the metal oxide and the boron oxide at a temperature that liquefies the boron oxide and may impregnate the metal oxide to produce an intimately linked cluster of metal oxide and boric oxide.

34 Claims, 4 Drawing Sheets

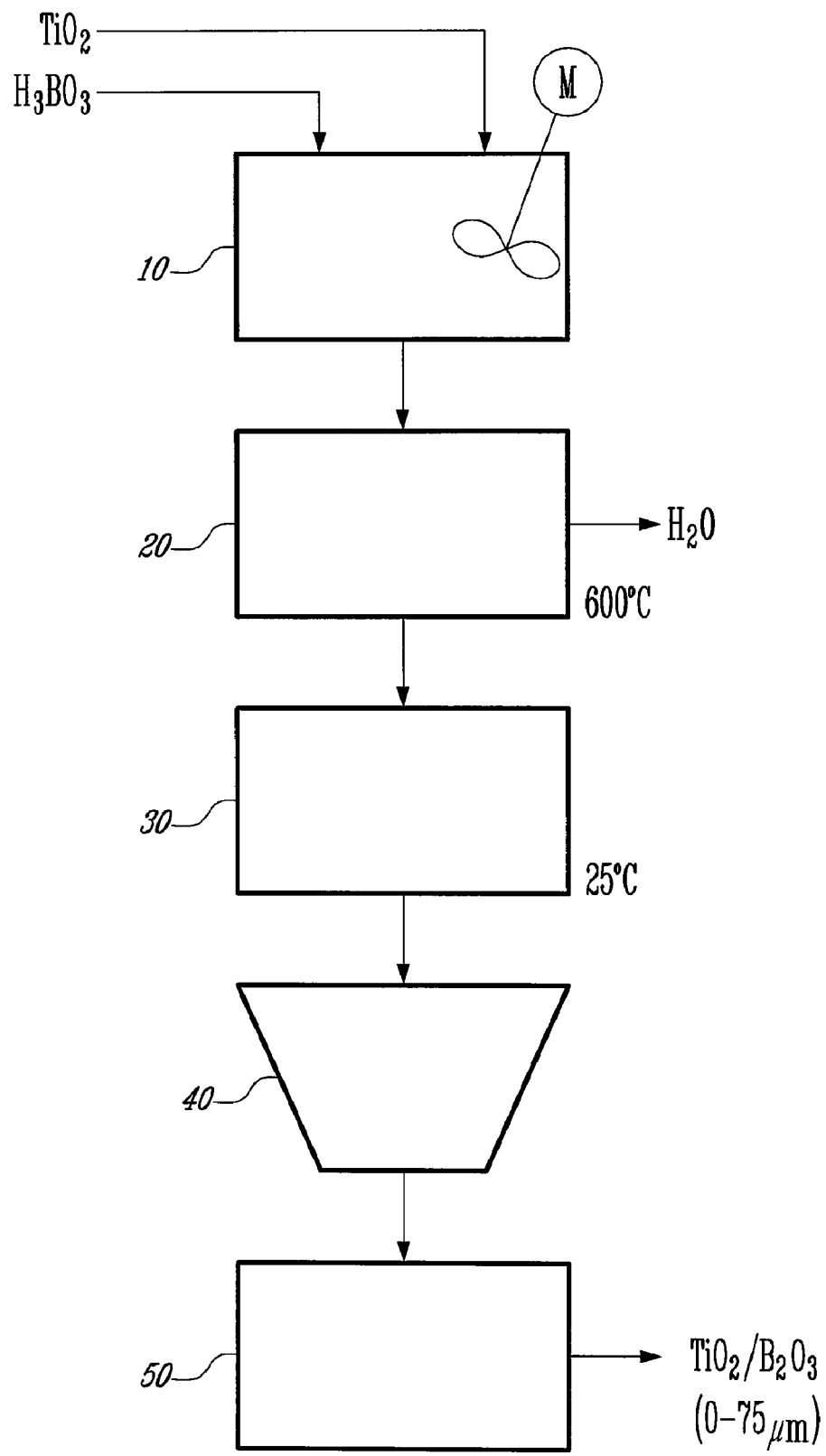

FIG_2a
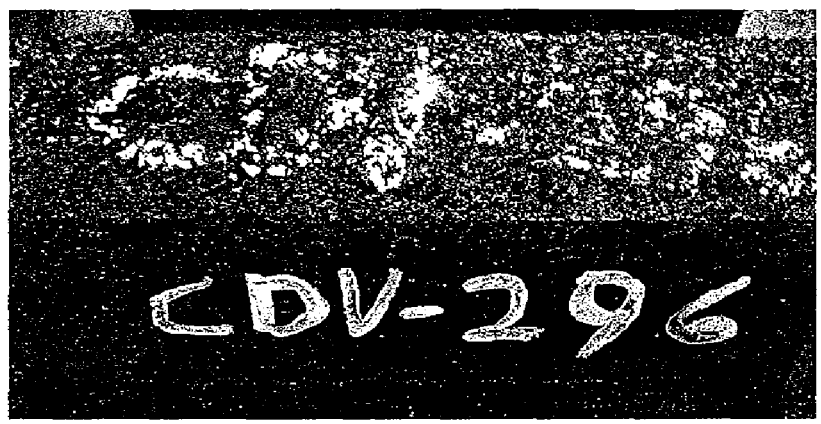
FIG_2b

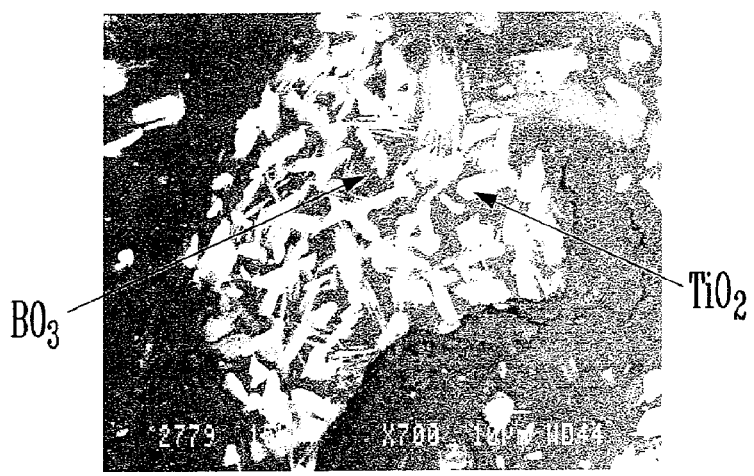
FIG_3a
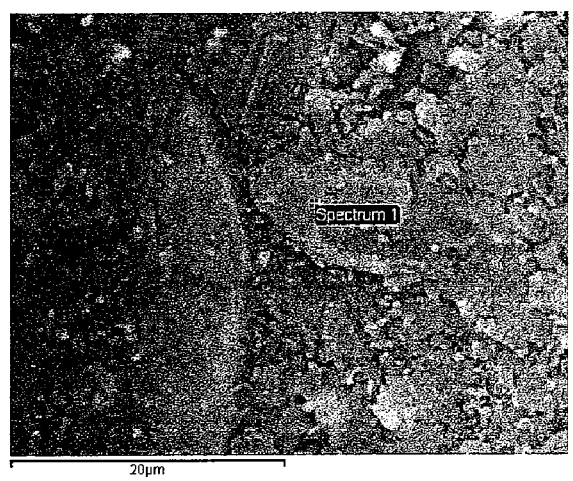
FIG_3b)i)
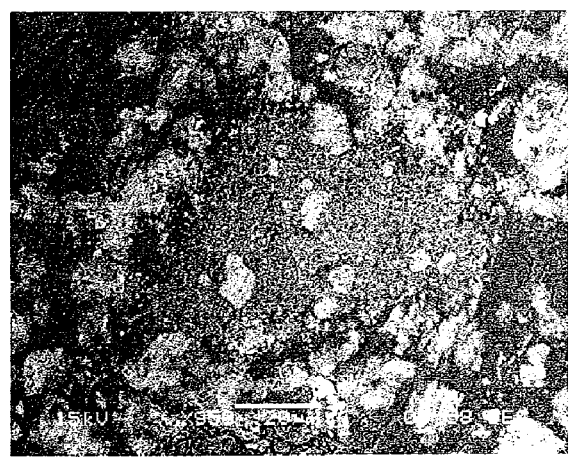
FIG_3b)ii)

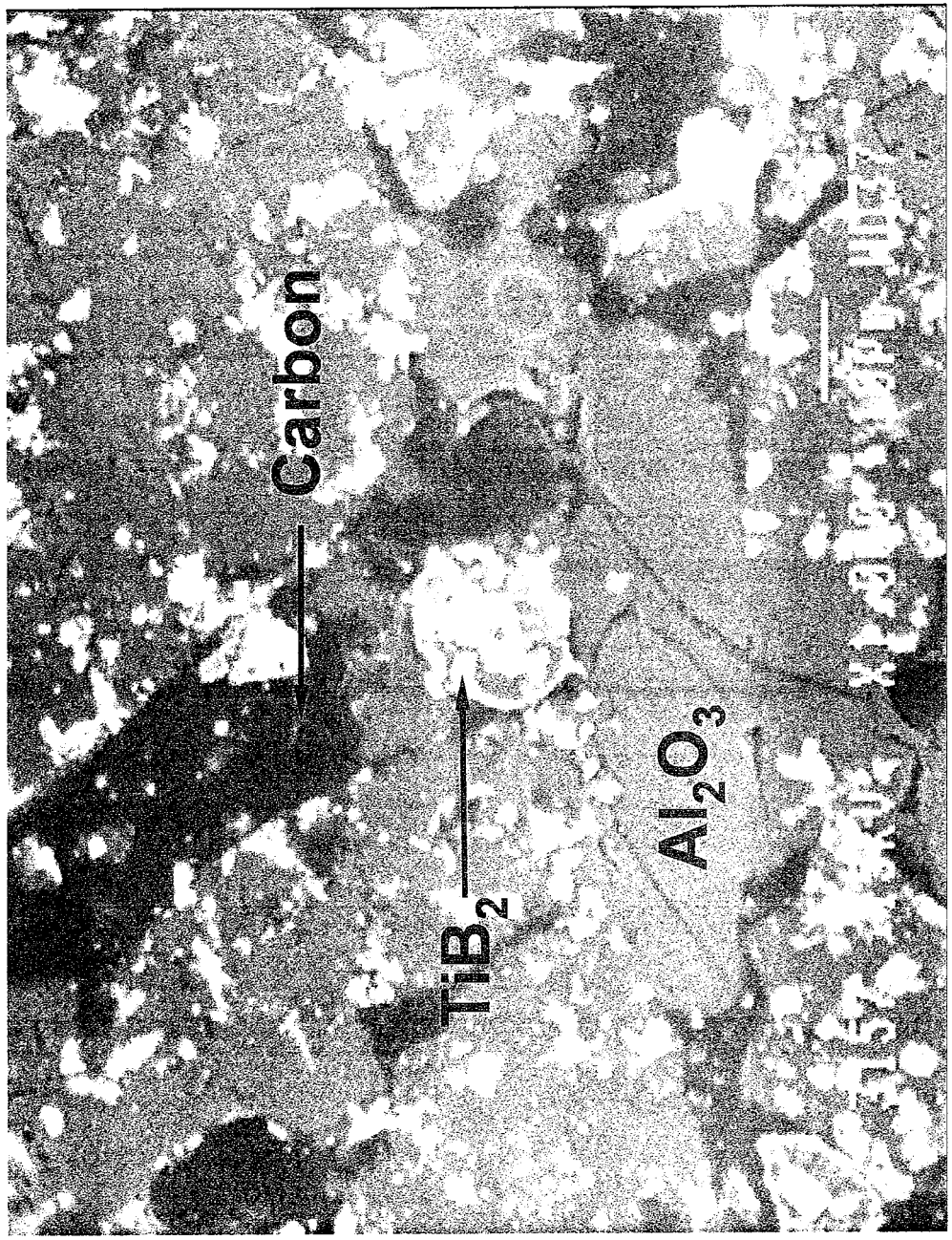

SEMI SOLID TIB$_2$ PRECURSOR MIXTURE

BACKGROUND OF THE INVENTION

1. Technical Field

The invention relates to the production of a metal boride precursor mixture comprising components which when combined with a carbonaceous component, produce a carbon composite material suitable for use in a cathode or cell lining of an aluminium electrolysis cell.

2. Description of the Prior Art

Metal borides, such as TiB$_2$ are used in an admixture with carbon components to form ramming pastes, cell linings and cathodes for electrolysis cells. Metal borides are known to improve surface wettability of the electrolytic cell components into which they are added. Although titanium diboride is preferred from the point of view of superior performance, it has the considerable disadvantage that it is very expensive.

Titanium diboride is generally formed by combining equal mole quantities of titanium oxide and boron oxide with a reducing agent. Carbon and aluminum, for example, are both known reducing agents. This reduction of the oxides to titanium diboride is also known to be possible at the start-up of an aluminium producing electrolysis cell, therefore producing TiB$_2$ in situ. However, it is known that in situ formation of the metal boride from the precursors proceeds suitably only if the reactants are thoroughly mixed one with the other, and in particular, contact between the metal oxide and the boron compound is required for the production of the metal boride.

Khazai et al. in U.S. Pat. No. 5,160,698 teach a process for producing metal borides using finely comminuted mixtures of reactants. The mixture of particulate reactants comprises: a metal compound, carbon, and a boron source having a particle size of about 200 microns which is heated to convert the mixture to a metal boride having an average particle size of about 0.05 to about 0.5 micron. The metal compound is one which can be converted to a corresponding metal boride by a reaction with carbon and the boron source under controlled conditions and at temperatures from 1200° C. to 2500° C.

Mirtchi et al. in European Patent EP 1 141 446 B1 teach a wettable and erosion/oxidation-resistant carbon composite material for use in the production of aluminium. Mirtchi et al. provide carbon composite materials which may be fashioned into cathode blocks, jointing pastes or the like that are erosion/oxidation resistant and wettable by molten aluminium when used in electrolysis cells while being relatively inexpensive and easy to produce. Mirtchi et al. utilize a precursor mixture that is preferably finely divided having average particle sizes sufficiently small to allow effective reaction of the precursor during the cell start-up to produce corresponding metal borides.

In preparing carbon composite mixtures containing the metal oxide and the boron compound, segregation of the metal oxide and boron compound may occur even when the particles are finely divided. Furthermore, boron oxide seems to have a detrimental effect on the carbon binder used in block production. Thus, mixing and baking is difficult and leads to lower quality products. It is the object of this invention to overcome at least some of the deficiencies in the prior art.

SUMMARY OF THE INVENTION

In accordance with one aspect of the invention, there is provided a metal boride precursor mixture comprising: a metal oxide, and boric oxide (B$_2$O$_3$), wherein the metal oxide and the boric oxide are physically linked in clusters and the boric oxide is intimately supported by the metal oxide.

In accordance with another aspect of the invention, there is provided a carbon composite material for use in an aluminium electrolysis cell as at least one of a cathode and a cell wall material, the composite material comprising: a carbonaceous component, and a metal boride precursor mixture comprising a metal oxide, and boric oxide, wherein the metal oxide and the boric oxide are physically linked in clusters and the boric oxide is intimately supported by the metal oxide.

In accordance with yet another aspect of the invention, there is provided a process for producing a metal boride precursor mixture comprising the steps of: providing a metal oxide wherein the metal oxide has a particle surface providing a boron component; mechanically mixing the metal oxide and the boron component to produce a particulate mix, and heating the particulate mix to a temperature where the boron component becomes a liquefied boric oxide and impregnates the particle surface to produce a physically linked cluster of metal oxide and boric oxide, and the boric oxide is intimately supported by the metal oxide.

BRIEF DESCRIPTION OF THE DRAWINGS

Further features and advantages of the invention will become apparent from the following detailed description, taken in combination with the appended drawings, in which:

FIG. 1 is a process diagram for producing a metal boride precursor mixture according to a preferred embodiment of the invention;

FIG. 2a is a micrograph of a green carbon composite block (Block A) made using a metal boride precursor mixture according to a preferred embodiment of the invention, showing small TiO$_2$ particles and a B$_2$O$_3$ binder-like phase;

FIG. 2b is a micrograph of a green carbon composite block (Block B) made using finely mixed but separate TiO$_2$/B$_2$O$_3$ materials similar to those of EP 1 141 446 B1;

FIG. 3a is a photomicrograph of a carbon composite material microstructure of block A including a TiO$_2$/B$_2$O$_3$ precursor mixture according to the invention;

FIG. 3b)i) is a photomicrograph of a carbon composite material microstructure at low magnification of block B with dispersed boron oxide in the binder phase and no TiO$_2$ in proximity;

FIG. 3b)ii) is a photomicrograph of a carbon composite material microstructure at low magnification of block B with dispersed TiO$_2$ in the material and no boron oxide in proximity; and FIG. 4 is a photomicrograph of a transformed precursor mixture particle after several days of electrolysis in an aluminium reduction cell.

DETAILED DESCRIPTION OF THE INVENTION

FIG. 1 illustrates a block flow diagram according to one embodiment of a process for the production of a metal boride precursor mixture of the invention. The precursor mixture includes a metal oxide and boric oxide.

The metal oxide of the invention may be selected from, but not necessarily limited to, titanium oxide (TiO$_2$), zirconium oxide (ZrO$_2$), hafnium oxide (HfO$_2$), vanadium oxide (V$_2$O$_5$ and V$_2$O$_3$), niobium oxide, tantalum oxide, chromium oxide and molybdenum oxide, and combinations thereof. In a preferred embodiment of the invention, the metal oxide is TiO$_2$ or ZrO$_2$, and in a particularly preferred embodiment is TiO$_2$.

The boric oxide of the precursor mixture in a preferred embodiment is produced from a boron component selected from the group consisting of ortho-boric acid (H$_3$BO$_3$) and meta-boric acid ($HBO_2$). Clearly, boric oxide ($B_2O_3$) may also be used as the boron component or starting material.

In a preferred embodiment, the metal boride precursor of the invention will have a metal oxide/boric oxide in a theoretical weight percentage needed to combine stoichiometrically under cell operations to form metal borides. Therefore, if the metal oxide is $TiO_2$, the amount of $B_2O_3$ needed to react to produce $TiB_2$ via Reaction 1 is 53 wt %/47 wt % $TiO_2/B_2O_3$ respectively. Although these weight % are preferred, small variations from these weight ratios are permissible. In particular, small excesses of the boron compound may compensate for volatilization which may still occur to a limited extent.

$$3TiO_2 + 3B_2O_3 + 10Al \rightarrow 3TiB_2 + 5Al_2O_3 \quad \text{Reaction 1}$$

Where the starting boron component is not boric oxide, the weight ratio of the starting components will be different. For example, in the case of $TiO_2/H_3BO_3$, the ratio is 40/60 wt %/wt % respectively, that produces the required 53 wt %/47 wt % $TiO_2/B_2O_3$ in the metal boride precursor.

In a preferred embodiment, the metal oxide and the boron component are provided as particulate materials having an average particle size of less than 200 micron. In the first step of the process, there is a particulate mixing step 10, where the two starting materials are mechanically mixed to produce a particulate mix. In a preferred embodiment, the metal oxide includes a high level of porosity into which the boron component may enter.

The second step of the process is a heating/baking step 20, wherein the particulate mix is heated progressively up to 600° C.

In one embodiment of the process to produce the metal boride precursor mixture of the invention, the temperature may be progressively increased in the following step-wise manner:
  a) from 25° C. to 120° C.; where the temperature of 120° C. is maintained for 15 minutes—at this temperature any surface moisture is evaporated;
  b) from 120° C. to 400° C., where the temperature of 400° C. is maintained for 15 minutes. At this temperature the reaction to produce the metal boride precursor may begin with the decomposition of the boron component and the evolution of water vapor; and
  c) from 400° C. to 600° C., where the temperature is maintained for more than 6 hours, or in a preferred embodiment for more than 20 hours. These longer time periods help to ensure: that the reaction goes to completion, that the $B_2O_3$ produced is in liquid form, and that the water vapor evolved in any decomposition reaction will have time to diffuse out of the metal boride precursor mixture. The skilled practitioner would understand that the precursor mixture can be heated in many ways to obtain a liquefied boron oxide, and up to at least about 450° C. where boron oxide becomes liquid.

After the heating/baking step 20, the precursor mixture is solidified in a mold, by reducing the temperature to 25° C. In this solidifying step 30, the molten $B_2O_3$ that has been liquefied in the heating/baking step 20, will solidify and become intimately supported on the metal oxide particles e.g. $TiO_2$ crystals. In the case where $TiO_2$ particles include pores, the $B_2O_3$ may enter into these pores. Therefore, the metal oxide and the boric oxide produce a physical connection, and in a preferred embodiment, the boric oxide is found within pores of the particle surface of the metal oxide.

The solidified precursor mixture is removed from a mold, i.e. demolded. This is followed by a crushing step 40 and a pulverizing step 50. In a preferred embodiment the crushing step 40 is performed in a jaw crusher. The pulverization step 50, is preferably performed in a rod mill or any apparatus with low heat production so as not to exceed the boron oxide melting point. The desired product size from pulverization 50, may be screened; and in a preferred embodiment, the metal boride precursor mixture has an average particle size less than 150 micron (−100 mesh).

The reactions which occur in heating/baking step 20 that produce the metal boride precursor mixture will now be discussed in greater detail by reference to the preferred embodiment in which the metal oxide is titanium oxide. If the starting boron compound is ortho-boric acid ($H_3BO_3$) a percentage of approximately 40% $TiO_2$ to 60% $H_3BO_3$ (by weight) or more exactly 39.3 wt % to 60.7 wt %, produces the appropriate weight % in the metal boride precursor (i.e. 53 wt %/47 wt % $TiO_2/B_2O_3$ respectively). However, to compensate for volatilization of the $B_2O_3$ in the final composite, as noted above, a percentage of 35% to 40% $TiO_2$ to 60% to 65% $H_3BO_3$ can be used. The heat treatment after mixing leads to the decomposition of $H_3BO_3$ following the approximate reaction below:

Reaction 2

$$2H_3BO_3 \xrightarrow{170° C.} 2HBO_3 + 2H_2O \xrightarrow{300° C.} B_2O_3 + H_2O.$$

Thus water vapor is evolved at two temperatures, approximately 170° C. and 300° C. Upon baking the metal oxide and the boron component, the global reaction from room temperature to 600° C. is given by the expression:

Reaction 3

$$H_3BO_3 \xrightarrow{600° C.} B_2O_3 + 2H_2O.$$

Therefore, if $TiO_2/H_3BO_3$ proportions of 40/60 wt %/wt % are used as starting materials, after completion of the Reaction 3 (above), the resulting proportions of $TiO_2/B_2O_3$ in the final mixture will be 53/47 wt %/wt % respectively. This final weight percentage of $TiO_2/B_2O_3$ equates to a theoretical loss of water of 26.5% from the starting $TiO_2/H_3BO_3$ mixture. This final weight percentage of $TiO_2/H_3BO_3$ corresponds to a molar ratio of 1:1, that is required to form one mole of $TiB_2$ from one mole of the precursor in Reaction 1 (previously defined).

At temperatures above 450° C., $B_2O_3$ is a liquid ($B_2O_3$ has a melting point of approximately 450° C.) and wets the $TiO_2$ particles. It should be mentioned that metal oxides have higher melting points, in the case of $TiO_2$, over 1800° C., and would remain in a solid crystal form.

Under process conditions, the molten $B_2O_3$ coats and impregnates the $TiO_2$ particles. The $B_2O_3$ is thus intimately mixed and physically bound to the metal oxide, and produces a semi-solid. In an embodiment where the $TiO_2$ particles includes pores, these pores will permit better impregnation by $B_2O_3$ into the $TiO_2$, and so as to maximize the $TiO_2/B_2O_3$ contacts. It is believed that this intimate contact between $TiO_2/B_2O_3$ limits the $B_2O_3$/carbonaceous (binder or pitch) interaction.

It has been further found that a portion of the boron component can be $Na_2B_4O_7$. This has a melting point in excess of 700° C. so cannot be used as the sole source, but as a portion of the boron component, it becomes mixed with the liquid boron oxide and coats and impregnates the $TiO_2$. As this compound is less volatile at higher temperatures than $B_2O_3$, the loss of boron can be controlled more effectively. Although not a preferred embodiment, the boron component could be solely $Na_2B_4O_7$ if higher processing temperatures are used. Similarly Borax (the hydrated form of $Na_2B_4O_7$) could be used in place of $Na_2B_4O_7$.

In order to minimize boron losses during baking, a small part of the boron oxide may be replaced by boron carbide ($B_4C$), which does not volatilize at normal baking temperatures. In small amounts, boron carbide will react with the titanium oxide and aluminium to form $TiB_2$.

The pulverized metal boride precursor mixture thus produced can now be made into carbon composite materials suitable for aluminium electrolysis cells.

The precursor is combined with a carbon material that may be graphite or calcined anthracite and a pitch binder. Preferably 10 to 40% by weight of the precursor mixture is used. More preferably 20 to 35% by weight of precursor mixture is used. The proportion of pitch to carbon material is adjusted to facilitate manufacture by normal means well known to the skilled worker.

In certain embodiments, titanium diboride may be added as well to the carbon composite mixture. This may be advantageous when a particular particle size or morphology combination is desired in the composite after it has been exposed to the cell environment, where this cannot be achieved by reaction of the precursor mixture alone. For example, combinations using from 10 to 40% by weight of precursor mixture with from 40 to 0% by weight of titanium diboride may be used.

In a typical composite material, 30% of the metal boride precursor mixture by weight is added to 51% graphite by weight, and combined with roughly 19% by weight of binder-pitch.

50 wt % of the metal boride precursor mixture has a particle size of −100+200 mesh, while the other 50 wt % is −200 mesh.

The carbon composite mixtures produced may be further processed by conventional forming and baking operations to form carbon blocks typically used as the cathode of an electrolytic cell. Such formed components are generally baked at temperatures of about 1100 to 1200° C. prior to use. Such temperatures are not sufficient to cause the carbon present to reduce the metal boride precursor mixture to the metal boride. The carbon composite mixture may also be used directly in the cell (as a "ramming mixture" to fix gaps around and between the carbon blocks, in which case the baking occurs during cell startup.

EXAMPLE 1

Comparison of Carbon Blocks

Table 1 presents a comparison between composite carbon blocks made using two different metal boride precursor materials. Block A was prepared using the precursor mixture of the present invention while Block B used finely mixed but separate $TiO_2/B_2O_3$ materials (i.e. no thermal treatment and crushing prior to mixing with the carbonaceous components) similar to that of EP 1 141 446 B1.

TABLE 1

| Components/Parameters | Block A<br>C Composite made from material of the precursor mixture of the present invention | Block B<br>C composite made of finely mixed separated oxide materials (Prior Art) |
| --- | --- | --- |
| Oxide mixture | | |
| $TiO_2$ | 15.9% - 100 mesh* | 15.9% - 100 mesh* |
| $H_3BO_3$ | 14.1% - 100 mesh | — |
| $B_2O_3$ | — | 7.05% - 200 mesh<br>7.05% - 100 to 200 mesh |
| Oxide treatment | See metal boride precursor mixture preparation | Mechanically mixed 5 minutes |
| Carbon composite | | |
| Graphite | 51% wt | 51% wt |
| Binder-pitch | 19% wt | 19% wt |
| Oxides | 15% - 100 + 200 mesh<br>15% - 200 mesh | 30% |
| Mixing temperature | 150 to 160° C. | 150 to 160° C. |
| Mixing time | 30 minutes | 30 minutes |
| Forming method | Vibro-compacted | Vibro-compacted |
| Forming time | 2 minutes | 2 minutes |
| Heat treatment temperature | 1150° C. | 1150° C. |
| Heat Treatment ramp | approx. 25° C. per hour | approx. 25° C. per hour |
| Heat treatment time (including heating and cooling) | 7 days | 7 days |
| Time at 1150° C. | 40 hours | 40 hours |

*The $TiO_2$ particles used in this experiment are fine - 1 micron spheres loosely agglomerated in small clusters.

During mixing in both Block A and Block B pitch hardening was observed in both cases but to a much higher degree in Block B. In Block B, the binder had lost most of its fluidity at the end of the mixing step and formed small very hard spheres of material that were very difficult to shape into a block form by standard procedures. The appearance of both Block A and Block B in their green (pre-baked) state is presented in FIGS. 2a and 2b respectively. It can be seen that beside the upper face Block A in FIG. 2a, there are no signs of major imperfections while there appears to be porosity observed in Block B (FIG. 2b).

Not wishing to be bound by any theory, it is believed that the hardening of the binder pitch during mixing is presumably due to pitch-$B_2O_3$ contacts at elevated temperatures. In fact, $B_2O_3$ is an acid compound known for its ability to catalyze organic reactions (Kirk-Othmer *Encyclopedia of Chemical Technology*, vol. 4, 5th Edition, John Wiley and Sons, pg. 249). This has a consequence of a rapid polymerization of the medium length carbonaceous chains into longer less mobile ones which may in some way explain the loss of fluidity at the mixing step. After baking, both carbon composite materials were examined. It was observed that Block B prepared from the finely mixed separated oxide materials included important macro-porosity.

Table 2 presents some properties of the Blocks A and B measured after baking (in Table 2, S.D. is the standard deviation of the average values).

TABLE 2

Properties of Blocks A and B after baking (three samples)

| Material | Bulk density (g/cm$^3$) | | Electrical resistivity (μΩ m) | | Compressive strength (MPa) | |
|---|---|---|---|---|---|---|
| | Average | S.D. | Average | S.D. | Average | S.D. |
| A | 1.7 | 0.004 | 58.0 | 3.28 | 23.4 | 2.81 |
| B | 1.7 | 0.002 | 74.5 | 2.19 | 28.5 | 1.12 |

Both blocks A and B have similar bulk densities and identical nominal compositions, this means that both blocks also have very similar levels of porosity after baking. The room temperature compressive strength of Block B was somewhat superior to that of Block A. This is believed to be due to the different room temperature microstructures arising from the presence of separate "glassy" $B_2O_3$ throughout that may improve room temperature strength. Note however that this may also result in lower mechanical strength at higher temperature since $B_2O_3$ will then be in its liquid state.

We see that Block B exhibits a much higher electrical resistivity than Block A. Electrical resistivity is a property that depends mostly on the nature of the raw materials and the material microstructure. Both materials have the same nominal composition and exhibit similar porosity, thus the difference is mostly due to the microstructure. In Block B the presence of a large fraction of $B_2O_3$ within the conductive binder phase is believed to act as an insulator and thus to considerably lower the ability of the latter to conduct electricity. Because electrical conductivity is a major property of the cathode block, this is one of the most important drawbacks of using a dry-mixed oxide.

FIGS. 3*a*, 3*b*)i) and 3*b*)ii) represent an overview of material microstructure of Blocks A (FIG. 3*a*) and B (FIGS. 3*b*(i) and (ii)). In FIG. 3*b*(i) the $B_2O_3$ is found dispersed in the pitch phase with no $TiO_2$ particles in the proximity. In FIG. 3*b*(ii) the $TiO_2$ is dispersed in the carbon mixture and we see that there are no boron oxides particles in the vicinity of the $TiO_2$.

On the other hand, $B_2O_3$ is almost always found surrounding the $TiO_2$ particles in Block A. In Block A as seen in FIG. 3*a*, instead of being spread inside the matrix, the oxide remains mostly located within clusters, and this is presumed to enable the formation of a continuous carbon network. This carbon network eventually provides the composite material of the present invention with a higher electrical conductivity.

The use of the metal boride precursor mixture of the invention in the carbon composite material has proven to be efficient in producing in situ $TiB_2$. FIG. 4 is a photomicrograph of a transformed precursor mixture particle after several days of electrolysis in an aluminium reduction cell. The micrograph shows $TiB_2$ particles in a matrix of alumina, which is a side product of the transformation reaction. Carbon, which is a component of the material, is also found in the vicinity of the $TiB_2$ particles. Observations both from laboratory specimens and samples from industrial sized cell cathodes show that $TiB_2$ may be formed quickly at the material surface by a reaction with metal aluminium. However, $TiB_2$ was also observed deep beneath the surface of the block after 200 days in a reduction cell. This may be by a reaction with the aluminium dissolved in the bath and transported through the cathode.

The metal boride precursor mixture, the carbon composite material produced from the metal boride precursor mixture and the process for producing the metal boride precursor mixture clearly offer the potential of greatly lower fabrication costs of the materials while avoiding problems encountered when simple mechanical mixtures of the components are used.

The embodiment(s) of the invention described above is (are) intended to be exemplary only. The scope of the invention is therefore intended to be limited solely by the scope of the appended claims.

The invention claimed is:

1. A metal boride precursor mixture consisting essentially of:
    a metal oxide, and
    boric oxide ($B_2O_3$),
    wherein the metal oxide and the boric oxide are physically linked in clusters and the boric oxide is intimately supported by the metal oxide.

2. The mixture of claim 1, wherein the metal oxide comprises a particle structure with pores and the boric oxide is found within the pores.

3. The mixture of claim 2, wherein the metal oxide is $TiO_2$.

4. The mixture of claim 3, wherein the weight percentage of $TiO_2/B_2O_3$ is 55-51wt % $TiO_2$/45-49 wt % $B_2O_3$.

5. The mixture of claim 3, wherein the weight percentage of $TiO_2/B_2O_3$ is 53wt % $TiO_2$/47 wt % $B_2O_3$.

6. The mixture of claim 1, comprising an average particle size distribution less than 150 micron.

7. A carbon composite material for use in an aluminium electrolysis cell as at least one of a cathode and a cell wall material, the composite material comprising:
    a carbonaceous component, and
    a metal boride precursor mixture consisting essentially of
    a metal oxide, and
    boric oxide,
    wherein the metal oxide and the boric oxide are physically linked in clusters and the boric oxide is intimately supported by the metal oxide and prepared by heating the precurser mix to a temperature not exceeding 600° C. where the boron component becomes a liquefied boric oxide and impregnates the particle surface; and
    wherein an average particle size distribution of the mixture is less than 150 micron.

8. The composite of claim 7, wherein the metal oxide comprises a particle surface with pores and the boric oxide is found within the pores.

9. The composite of claim 7, wherein the carbonaceous component is a mixture of graphite or calcined anthracite and pitch.

10. The composite of claim 9, comprising a composition of 10 to 40 wt % metal boride precursor mixture.

11. The composite of claim 10, comprising titanium diboride.

12. A carbon block component produced with the carbon composite material defined in claim 7.

13. A process for producing a metal boride precursor mixture consisting essentially of metal oxide and a boron component comprising steps of:
 providing the metal oxide wherein the metal oxide has a particle surface
 providing the boron component;
 mechanically mixing the metal oxide and the boron component to produce a particulate mix, and
 heating the particulate mix to a temperature not exceeding 600° C. where the boron component becomes a liquefied boric oxide and impregnates the particle surface to produce a physically linked cluster of metal oxide and boric oxide, and the boric oxide is intimately supported by the metal oxide.

14. The process of claim 13, wherein the boron component is selected from the group consisting of ortho-boric acid ($H_3BO_3$), metboric acid ($HBO_2$), and boric oxide ($B_2O_3$).

15. The process of claim 13, wherein the boron component is ortho-boric acid ($H_3BO_3$).

16. The process of claim 15, wherein the ortho-boric acid ($H_3BO_3$) upon heating decomposes to the liquefied boric oxide ($B_2O_3$) and water.

17. The process of claim 13, further comprising solidifying the boric oxide of the cluster.

18. The process of claim 13, wherein the heating is by a progressive increase of temperature of the particulate mix to greater than 450° C.

19. A metal boride precursor mixture comprising:
 $TiO_2$, and
 boric oxide ($B_2O_3$),
 wherein the metal oxide and the boric oxide are physically linked in clusters and the boric oxide is intimately supported by the metal oxide; and
 wherein the weight percentage of $TiO_2/B_2O_3$ is 55-51 wt % $TiO_2$/45-49 wt % $B_2O_3$.

20. The mixture of claim 19, wherein the metal oxide comprises a particle structure with pores and the boric oxide is found within the pores.

21. The mixture of claim 19, wherein the weight percentage of $TiO_2/B_2O_3$ is 53 wt % $TiO_2$/47 wt % $B_2O_3$.

22. The mixture of claim 19, comprising an average particle size distribution less than 150 micron.

23. A carbon composite material for use in an aluminium electrolysis cell as at least one of a cathode and a cell wall material, the composite material comprising:
 a carbonaceous component, and
 a metal boride precursor mixture as claimed in claim 19.

24. The composite of claim 23, wherein the $TiO_2$ comprises a particle surface with pores and the boric oxide is found within the pores.

25. The composite of claim 23, wherein the carbonaceous component is a mixture of graphite or calcined anthracite and pitch.

26. The composite of claim 25, comprising a composition of 10 to 40 wt % metal boride precursor mixture.

27. A carbon block component produced with the carbon composite material defined in claim 23.

28. A process for producing the metal boride precursor mixture of claim 19, comprising steps of:
 providing a metal oxide wherein the metal oxide has a particle surface
 providing a boron component;
 mechanically mixing the metal oxide and the boron component to produce a particulate mix, and
 heating the particulate mix to a temperature where the boron component becomes a liquefied boric oxide and impregnates the particle surface to produce a physically linked cluster of metal oxide and boric oxide, and the boric oxide is intimately supported by the metal oxide.

29. The process of claim 28, wherein the boron component is selected from the group consisting of ortho-boric acid ($H_3BO_3$), meta-boric acid ($HBO_2$), and boric oxide ($B_2O_3$).

30. The process of claim 28, wherein the boron component is ortho-boric acid ($H_3BO_3$).

31. The process of claim 30, wherein the ortho-boric acid ($H_3BO_3$) upon heating decomposes to the liquefied boric oxide ($B_2O_3$) and water.

32. The process of claim 28, further comprising solidifying the boric oxide of the cluster.

33. The process of claim 28, wherein the heating is by a progressive increase of temperature of the particulate mix to greater than 450° C.

34. The process of claim 28, wherein the temperature does not exceed 600° C.

* * * * *